United States Patent

Breeding

[15] 3,638,365
[45] Feb. 1, 1972

[54] METHOD AND APPARATUS FOR FORMING FITTING COVERS

[72] Inventor: Dillard Breeding, Nashville, Tenn.

[73] Assignee: Breeding Insulation Company, Inc., Nashville, Tenn.

[22] Filed: Apr. 30, 1970

[21] Appl. No.: 43,620

Related U.S. Application Data

[62] Division of Ser. No. 734,017, June 3, 1968, Pat. No. 3,574,972.

[52] U.S. Cl. ..........................................................51/281
[51] Int. Cl. .........................................................B24b 1/00
[58] Field of Search ..................51/3, 72, 96, 98.5, 281, 327

[56] References Cited

UNITED STATES PATENTS 1,929,117  10/1933  Leyner et al. ...........................51/281
1,667,719  5/1928   Cooney....................................51/72 X
2,762,170  9/1956   Hunziker..................................51/96 X
2,948,085  8/1960   Casady.....................................51/73 X
2,780,896  2/1957   Jaye........................................51/74 X Primary Examiner—James L. Jones, Jr.
Attorney—Robert G. McMorrow

[57] ABSTRACT

Abrasive means are employed to shape covers for conduit fittings from blocks of insulation material, illustratively foam plastic or fiberglas. The covers are formed in half sections and are employed in pairs; and Apparatus for use in a system of forming insulation for pipe fittings such as elbow and T-sections, the apparatus including a work support and a rotatable shapping element projecting thereabove, in which a block of insulation material is moved against the shaping element in a controlled path of travel.

8 Claims, 18 Drawing Figures

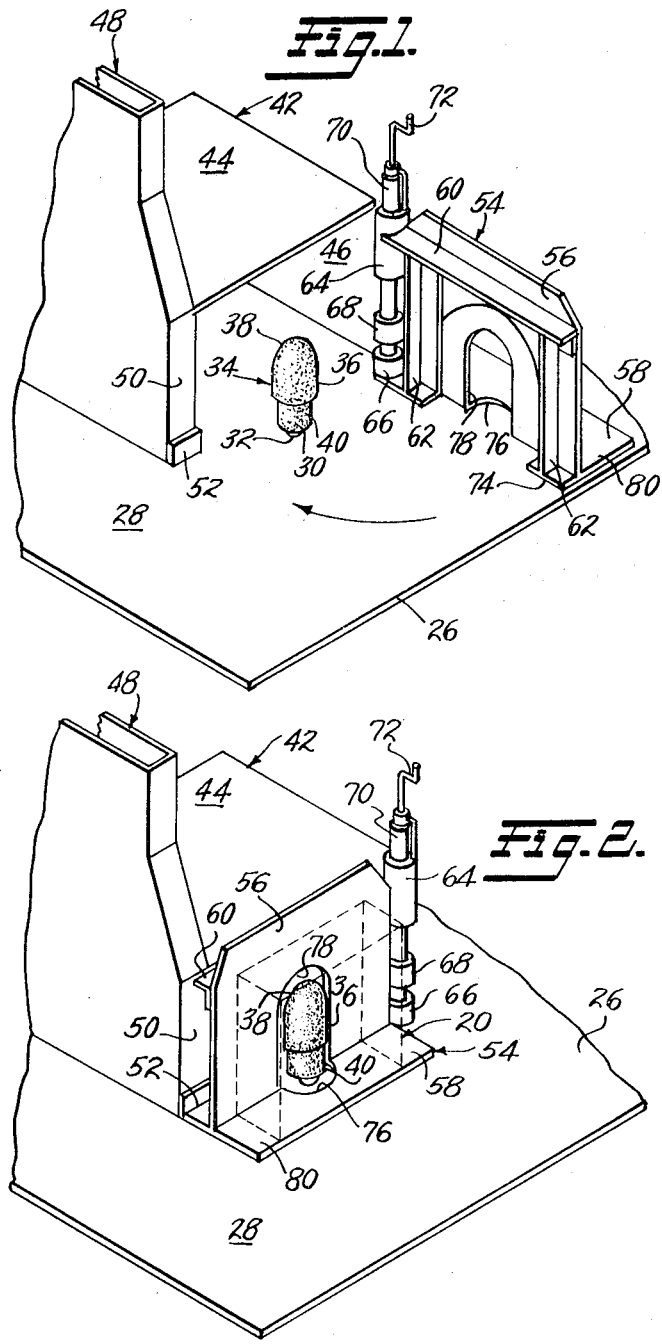
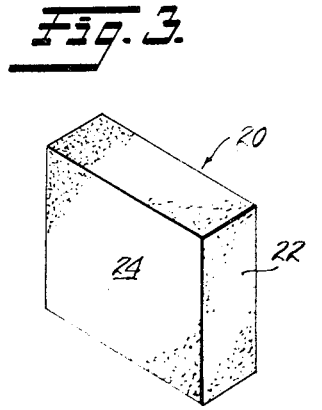
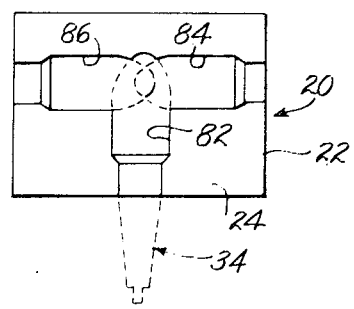
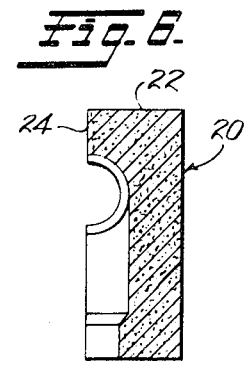
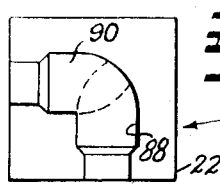
INVENTOR
DILLARD BREEDING
BY Robert G. McMorrow
ATTORNEY

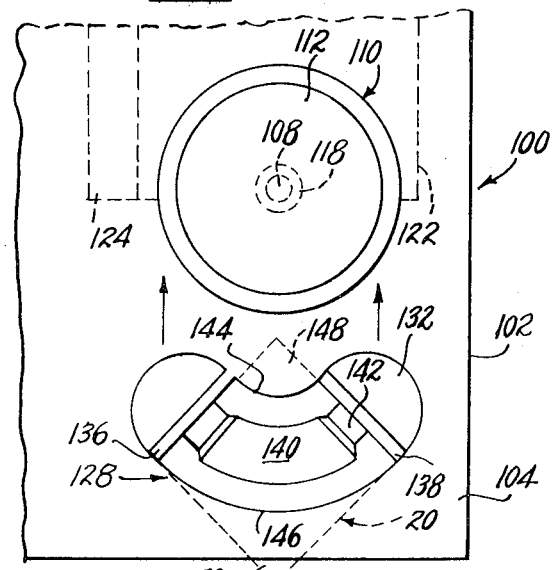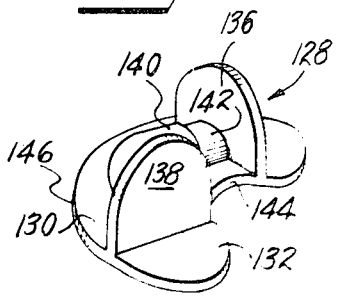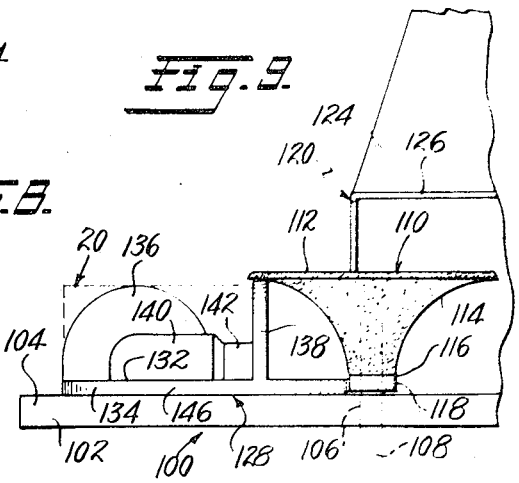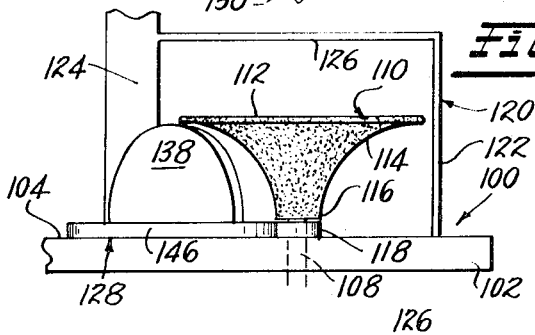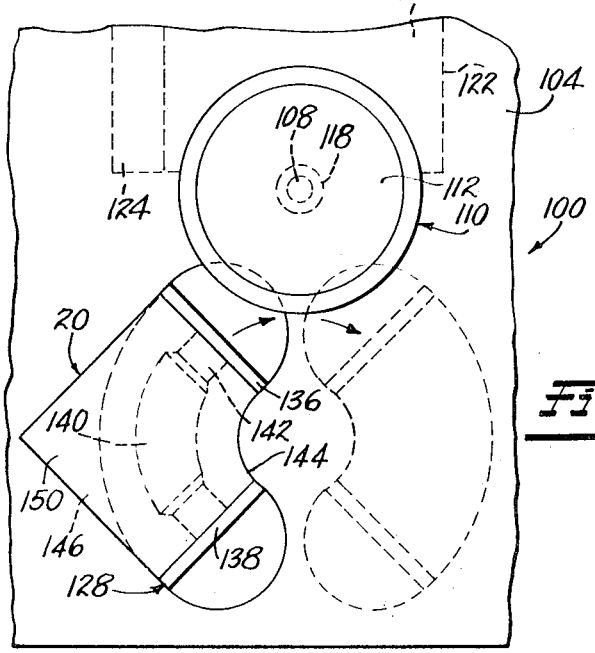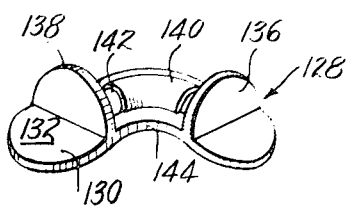

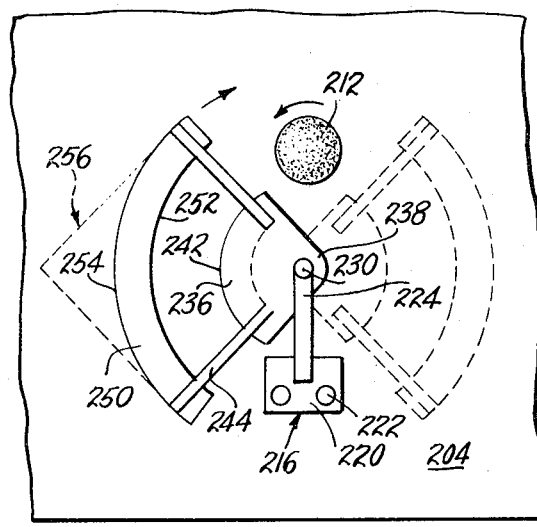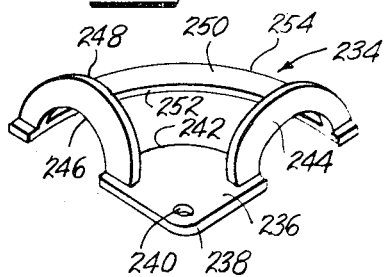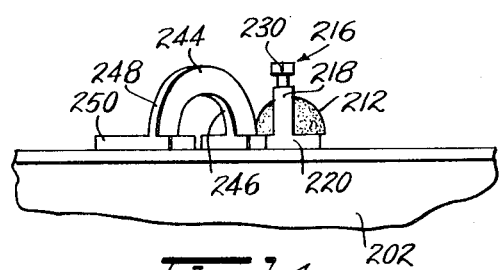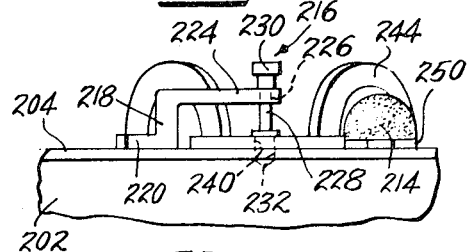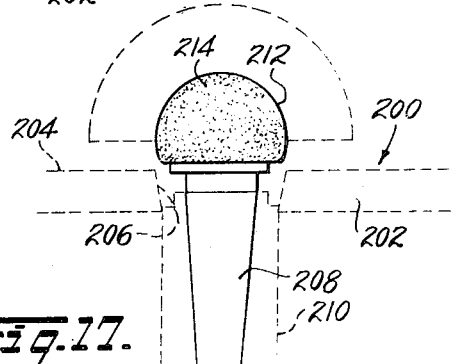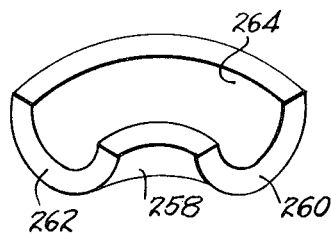

METHOD AND APPARATUS FOR FORMING FITTING COVERS

CROSS REFERENCE TO RELATED APPLICATION

This application is a division of application Ser. No. 734,017, filed June 3, 1968 now U.S. Pat. No. 3,574,972.

BACKGROUND OF THE INVENTION

1. Field of the Invention

This invention relates to the fabrication of insulating covers for pipe fittings of various forms, to an improved method of making such covers, and to preferred apparatus for practice of the method.

2. Statement of the Prior Art

In prior U.S. Pat. No. 3,350,816, issued Nov. 7, 1967, a machine for the fabrication of straight half sections of insulation covering for pipes and the like is shown. That machinery, and improved adaptations of it, has proven of great utility in the fabrication of foam plastic and similar cellular materials into insulation covers. Heretofore, however, it was necessary to cover nonlinear fittings and sections with covers either formed in molding operations or by wrapping procedures. These methods are not amendable to mass production practices and greatly increase production and installation costs.

SUMMARY OF THE INVENTION

In the present method, blocks of insulation material are formed on cutting equipment, preferably of the abrading type, in a sequence of operation which lends itself to rapid production and to product uniformity. The invention, as embodied in its method of manufacture, relates to the formation of interior cavities in desired orientation and configuration corresponding to the shape of a fitting to be covered, and to subsequent outer formation of the element to correspond to a general, enlarged outline form of the fitting consistent with the dimensional characteristics of related insulation on straight sections of conduit.

A basic objective of the invention therefore resides in providing means for the shaping of plastic materials wherein the finished product is of a form corresponding to the shape of an article to be associated therewith. Related to this basic objective is that of supplying apparatus for the formation of blocks of material into fitting covers for conduit fittings and the like.

Among the objectives of importance of the present invention is that of providing a method of manufacture wherein a curved or angular channel is formed in a rectangular block in an abrading operation. In one instance, this channel formation involves the formation of sequential linear abrasions in one face of a block of raw material, with appropriately angled rotation of the block intermediate the formation of the individual abrasions. In another instance, the block is moved arcuately over an abrading means in said operation. The invention further comprehends the forming of outer configurational requirements through abrasion, the blocks being mounted in templates during such operation.

Another significant feature of the present invention concerns the provision of new and novel abrading assemblies, including spindles, frames and template means for the controlled formation of materials in the manner aforesaid.

Still another objective relates to the provision of means for movement of a block of raw material over an abrading surface for the purpose of forming an angular or curved channel therein, the means including a pivoted guide template.

Other and further objects and advantages of the invention will become apparent to those skilled in the art from a consideration of the following specification when read in conjunction with the annexed drawings.

BRIEF DESCRIPTION OF THE DRAWINGS

FIG. 1 is a perspective view showing a portion of first apparatus constructed and assembled in accordance with the teachings of this invention;

FIG. 2 is a second perspective view, similar to FIG. 1, showing the components in a different operating position;

FIG. 3 is a perspective view illustrating a blank of raw material for practice of the invention;

FIG. 4 is a plan view of a finished section half fabricated from the blank of FIG. 3;

FIG. 5 is a plan view showing a different type of cover made from a blank of the type shown in FIG. 3;

FIG. 6 is a sectional view through a medial section of the product of FIG. 5;

FIG. 7 is a plan view of second apparatus within the scope of this invention;

FIG. 8 is an elevational view showing the apparatus of FIG. 7 in a first operating position;

FIG. 9 is a second elevational view showing said apparatus in a different operating position;

FIG. 10 is a perspective view of a guide template of the present invention;

FIG. 11 is a top plan view similar to fig. 7, illustrating the operation of the invention in a second sequence, movement of the template with respect to the remaining portions of the apparatus being illustrated in the full-to-phantom line portions thereof;

FIG. 12 is a further perspective view of the template shown in FIG. 10;

FIG. 13 is a top plan view of a third type of apparatus hereof;

FIG. 14 is a side elevational view of the FIG. 13 apparatus;

FIG. 15 is a view similar to FIG. 14, showing a different operation position of the apparatus;

FIG. 16 is an enlarged perspective view of further template means hereof;

FIG. 17 is an enlarged elevational view of a shaping element as associated with the support means hereof; and FIG. 18 is a perspective view of the finished product made on the apparatus of FIGS. 13 through 17.

DESCRIPTION OF THE PREFERRED EMBODIMENTS

FIGS. 3 and 4 of the drawings illustrate sequential steps of operation on a block of material 20 leading to formation of a cover for a fitting in a conduit system—the fitting here being illustratively of T-form. It will be understood that the method of formation and the apparatus employed therein are readily adaptable to other and different forms of fitting without substantial change or modification. For further example, FIGS. 5 and 6 show the formation of a cover for a shaped L-fitting.

The initial blank 20 of insulation material is of rectangular or square form and has been cut or otherwise preshaped to a selected size. For purposes of description, the blank as thus formed has sides 22 and front and rear faces 24.

FIGS. 1 and 2 disclose first apparatus employed in the system of this invention. Such apparatus comprises a work table 26 or a similar support having a top surface 28 with an opening 30 formed therein. Projecting through the opening 30 is a spindle 32 which is constantly rotating when the apparatus is in operation, being powered by a suitable energy source of any known type. The spindle has a cutting element 34 fixed to that portion thereof which projects above the top surface 28 of the table. The cutting element is preferably of the abrasive type having a plurality of cutting means thereon, and is shaped to conform to the configuration of a selected portion of the fitting to be covered. In the illustration, the cutting element is of substantially cylindrical form, having an enlarged top portion 36 tapering to an apex 38, and a reduced skirt 40. The skirt corresponds to the diameter of the conduit per se, while the maximum diameter portion 36 is equivalent to that of the fitting. The curvature of the taper leading to the apex 38 is generally akin to the curve of the fitting to be covered.

It is desirable that the discharge area adjacent to cutting area be covered. To this end, a housing 42, consisting of a top wall 44 and a side wall 46 is supplied. Opposite wall 46 the top wall is connected to an upstanding stop assembly 48. The assembly 48 includes a forward panel section 50 with a base abutment 52, aligned laterally with substantially the midpoint of the cutting element 34.

A work holding bracket 54 comprises a vertical plate 56 having a base member 58 and inner rigidifying structural members 60 and 62. The bracket has hinge sleeves 64, 66 fixed to the member 60 and to the base member 58, respectively. A further hinge sleeve 68 extends from the housing sidewall 46 and is vertically in line with the sleeves 64 and 66. A hinge pin 70 extends through the aligned sleeves, thereby hingedly connecting the brackets 54 to the housing. A screw-type connection means secures the bracket in its mount, and an actuating handle 72 may be supplied for the changing or adjustments of the bracket.

The inward dwell or extent of movement of the bracket with respect to the cutting element is controlled by contact of the innermost edge 74 of the base member 58 with the abutment 52. If desired, a changeable screw means (not shown) may be interposed between the stop assembly 48 and the bracket for adjustment of the dwell.

As indicated in the drawings, the plate 56 is secured to the base member 58 intermediate the leaving and trailing edges of the latter. The leading or intermost edge 74 has a semicircular recess 76 formed therein, and a plate 56 has a slot 78 positioned over the recess. The slot 78 is of a size such that the cutting element 34 is extendable therethrough.

In operation, assuming that a cover for a T-fitting is to be made, of the type indicated in FIG. 4, the block 20 of fiberglas, polystyrene, or the like is placed in a first position on the bracket, resting on the ledge 80 formed thereby rearwardly of the plate 56. Indicia or other suitable lateral positioning means on the plate may be employed to insure uniformity of the positioning of the block. The bracket, with a block positioned thereon, is pivoted in the direction of the cutting element, whereby the cutting element forms a first indentation 82 therein of a shape approximately one-half that of the element. The bracket is then pivoted outwardly, and the block rotated substantially 90° in either direction, the procedure being thereafter repeated resulting in a second cut 84 which extends into or intercepts the first cut. Then, the block is rotated substantially 180° and a third cut 86 is formed. The result is the formation of the T-cavity shown in FIG. 4. It will be observed that these areas of cut intercept at substantially the areas of taper of the cutting element or indentation indicated thereby the apex 38, whereby the shape of the finished cavity is a function of the form of the cutter. The cutter is changeable in the apparatus where it is desired to alter the cavity shape, and a further example of this is shown in FIGS. 5 and 6. There, the block 20 is formed to a half section of cover for a fitting known as a shaped-L. A first cut 88 is initially formed followed by the imposition of a second cut 90 related to the first at substantially a right angle. Here the tapered sections of the cutter and the resulting indentations in the block are formed to intercept one another as a degree of curvature substantially equals to that of the fitting to be covered.

The foregoing relates to a first method and apparatus for fabrication of the inside portion of the half section of fitting cover. For the sake of appearance, and also for other functional reasons, it is often necessary to shape the outside of the cover halves to a form approximately that of the fitting. FIGS. 7 through 12 of the drawings disclose preferred means for accomplishing the latter purpose.

In FIGS. 7 through 9, the exterior shaping means hereof is generally identified by reference numeral 100. The means 100 comprises a second support 102 having an upper surface 104. (This may, in practice, be the same support and surface as that described above, at a different location thereon.) Extending through an opening 106 in the support is a rotatable shaft 108. The shaft projects upwardly from the surface and has a second shaping element 110 mounted on its outer end portion. The shaping element 110 has a top 112 and an inwardly disposed cutting area 114, preferably coated with an abrasive substance. Mounted on the shaft between the surface 104 and a bottom 116 of the shaping element 110 is an annular bearing 118.

A housing 120, comprising sidewalls 122, 124 is disposed partially above the element 110, and has a top wall 126. The housing provides the means to avoid scattering of scraps during the cutting or shaping operation.

The apparatus 100 is concerned with the formation of a half section of fitting cover after the initial operations on the blank effected by the first apparatus described above. For purposes of illustration of this second operation, the blank 20 shaped to the form shown in FIG. 5 for covering a shaped-L fitting will be discussed. It will be clear from this description that other forms of fittings will be accommodated by modifications of the configuration of the shaping element 110, and a novel guide template 128.

In the drawings, the template 128 will be seen to comprise a curvilinear base 130 having flat upper and lower faces 132, 134. Positioning ears 136, 138 extend from the upper face 132 at spaced intervals and substantially 90° angular relation to one another. Mounted between these ears is a half section of pipe fitting, in the illustrated example a shaped-L with an enlarged central section 140 and reduced ends 142. The blank 20 has cuts 88 and 90 therein collectively forming a recess to receive and frictionally grip the fitting portion 140 and 142. The side edges 22 of the blank fit between the positioning ears. The template base 130 has guide edges 144, 146, and the blank 20, when mounted on the template as suggested by the foregoing, has its corner portions extended outwardly thereof as shown at 148 and 150 in FIG. 7.

In the completion of the shaping operation on the blank 20, the template and blank are brought into contact with the element 110—the lower face 134 being held in flush relation to the upper surface 104. The inner guide edge 144, when in contact with the housing 118, limits the inward movement of the template and therefore the action of the cutting or abrading surface 114 on the blank 20. This limitation is such that the blank is altered by removal of the corner portion 148. The template is then reversed and brought into contact with the abrading surface 114 in an arclike motion (FIG. 11) again to the depth of the guide edge 146. This causes removal of the corner portion 150, as a consequence of which the outer surface is formed in a semicircular form approximately the outer form of the L. This semicircular form approximating closely that of the positioning ears 136 and 138, and it will be noted that the sections of the base exterior of the positioning ears provides handle means for the manual imposition of the template into cutting relation to the element 110. The ears further limit the cut and avoid unwanted removal of material.

FIGS. 13 through 18 in the drawings illustrate the second form of means for the interior shaping of a half section of fitting cover. This form of the invention is particularly applicable to the formation of a smooth L covering, that is, one in which the curvature is of uniform sectional dimension throughout.

As in the previously described forms of the invention, the apparatus 200 comprises a support 202 of suitable type. The support 202 has a flat working surface 204 with an opening 206 therein. The rotating shaft 208 mounted in a collet 210 projects through and above the surface 204. A cutting or shaping head 212 is fixed on the shaft, and has an abrasive outer surface 214 or the equivalent thereof. The head 212 is of a diametric sectional shape and dimension substantially equal to the area to be cut or removed from a blank of material in the formation of a smooth L, or the like.

Secured on the support 202 adjacent the head 212 is a bracket 216. The bracket includes a pedestal 218 extending from a base 220. The base 220 is connected on the surface 204 by fastening means 222. An arm 224 projects outwardly from the distal extremity of the pedestal, and has an opening 226 formed in its outer end. A pin 228 having an enlarged head 230 extends through said opening. The pin is of a length such that it is extendable into a bore or opening 232 in the support 202.

Guide template means 234 is shown disassembled from the remainder of the apparatus in FIG. 16. The means includes a pivot member 236 of generally triangular form having an apex section 238 with an aperture 240 formed therein. The member 236 has a rounded edge 242. Two right angularly arranged, spaced-apart bridging members 244 extend from pivot member. Each of the bridging members is of arcuate, semicircular form, having a concave lower edge 246 and a convex outer edge 248. An outer arcuate brace member 250 extends between the outer ends of the bridging members, the brace member having a concave edge 252 facing the edge 242 of the pivot member and parallel therewith. The outer edge 254 of the brace is convex.

As best illustrated in FIG. 13, the pivot member is connected to the pin 228 in such manner that the guide template is pivotal about the pin as its axis. The spacing between the edges 242 and 252, and the form and height of the edges 246 is such that the template is pivotal over and about the shaping element head 212. A blank of material 256 (the outer surface 258 of which is shaped to desired configuration, FIG. 18, either before or after the operation thereon by the apparatus 200) is mounted in the guide template, with its ends 260, 262 engated between the bridging members 244. The assembly is then pivoted over the head 212, resulting in formation of an arcuate channel 264 in the blank.

The various section halves formed as described above are related at the time of manufacture in matched pairs, and may be temporarily prejoined in such pairs by the application of a removable tape or mastic thereto. In permanent installations, a more lasting type of tape or mastic is employed in joining the section heads together about the fitting to be covered.

Having described and illustrated several embodiments of this invention in some detail, it will be understood that these descriptions and illustrations have been offered mainly by way of example, and that the invention is to be limited in scope only by the appended claims.

I claim:

1. A method of shaping an insulation half from a block of insulation material, the shaped half being of a form to cover a half section of conduit of curvilinear form, comprising the steps of:
   placing the block against a rotating cutting spindle and imposing a force causing said spindle to cut a half section of the spindle diameter into the block;
   removing the block from cutting relation to the spindle and rotating the block in an arc of rotation substantially equal to the curve of the half section of the conduit to be covered; and
   moving the block and the spindle together in such manner that the spindle cuts a second indentation in the block, intercepting the first indentation at an arc equal to the curve of the half section of conduit.

2. The method of claim 1, wherein:
   the block is of substantially rectangular form, and includes at least two flat sides;
   the flat sides serving as guide means for correlation of the block and the cutter.

3. The method of claim 1, wherein:
   the cutting spindle has a cutting surface of a shape substantially equal to the shape of the conduit; and the surface is abrasive.

4. The method of claim 1, wherein:
   the spindle is mounted in a fixed rotating position; and the block is moved against the spindle.

5. The invention of claim 4, wherein:
   the block is mounted in a bracket; and
   the bracket is pivoted for movement against the spindle in a predetermined path of travel.

6. The invention of claim 1, and:
   placing the formed block on a template, the template having outer guide edges of the desired curve of the finished shaped half; and
   placing the block against the rotating cutter to such depth that the inside and outside areas of the block are shaped by the cutter.

7. A method of shaping an insulation half from a block of insulation material, the shaped half being of a form to cover a half section of conduit of curvilinear form, comprising the steps of:
   moving the block in a prescribed arc substantially equal to the curvature of the conduit against the rotating cutting element disposed at substantially the midpoint of the arc of travel of the block, the cutting element being of cross-sectional form substantially equal to the cross-sectional outside dimension of the conduit.

8. The invention of claim 7, wherein:
   the cutting element has an abrasive outer surface; and the block is of foam plastic.

* * * * *